A. P. ROUTT.
Fertilizer.

No. 65,610.

Patented June 11, 1867.

Witnesses:
Chas A Pettis
John E Lipson

Inventor:
Ansell P Routt
By Munn & Co
Attorneys.

United States Patent Office.

ANSELL P. ROUTT, OF LIBERTY MILLS, VIRGINIA.

Letters Patent No. 65,610, dated June 11, 1867.

SEEDING MACHINE AND FERTILIZER.

The Schedule referred to in these Letters Patent and making part of the same.

TO ALL WHOM IT MAY CONCERN:

Be it known that I, ANSELL P. ROUTT, of Liberty Mills, in the county of Orange, and State of Virginia, have invented a new and useful Combined Seeder and Fertilizer; and I do hereby declare the following to be a full, clear, and exact description of the same, reference being had to the accompanying drawings, forming part of this specification, and in which—

Similar letters of reference indicate corresponding parts in the several figures.

The object of my invention is to construct a machine which will drop the fertilizing substance and the seed in the hill together in the proper manner, and which will be simple, cheap, easily worked, and not liable to get out of repair.

A A represent the frame, B the draw-beam, C the furrowing-tooth, D D the covering-teeth, E E the handles, F F braces which support the handles E E, G the double feed-box, and H the conducting tube to convey the seed and fertilizer from the feed-box to the ground. On a shaft, I, which runs on bearings attached to the under side of the frame A A, is fixed a roller or wheel, K, which, coming in contact with the ground, is caused to revolve and communicates motion by means of the crank $k$, the pitman L, and the crank $m$, to the agitator M inside of the fertilizer apartment of the feed-box G. N is the distributing roller, extending across the machine under the feed-box, revolving on bearings $n$ $n$ in the frame A A, and worked by means of the drum and belt O O' connecting with the drum P on the right-hand end of the shaft I. Q Q are braces supporting and confining the feed-box G. R is a movable cover upon the feed-box, attached by a hinge, and fastened by a loop and pin, or their equivalent.

Figure 1:
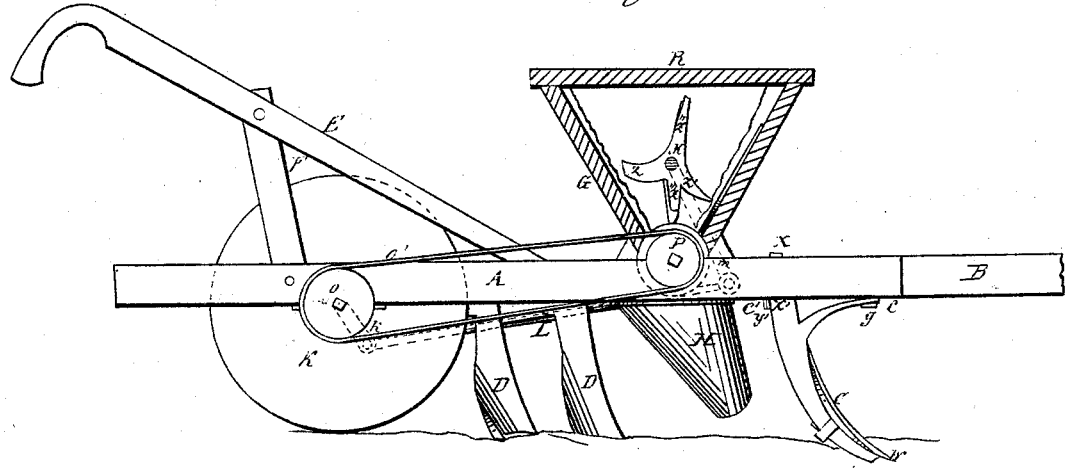
Figure 1 represents a longitudinal sectional elevation of my machine.
Figure 2:
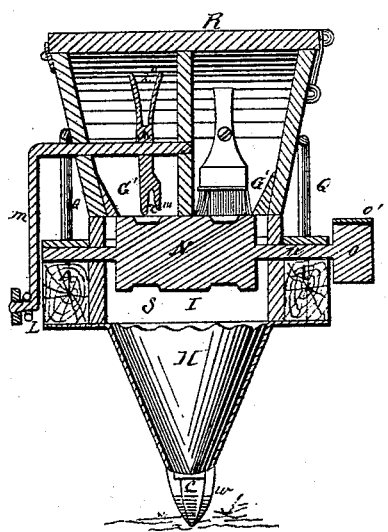
Figure 2 is a transverse section of the double feed-box G, showing the distributing roller.

At S the distributing roller N and the interior of the conducting tube H are exposed to the view of the operator, who is thus enabled to see at a glance whether the machine is clogging or not. The construction of the distributing roller N is not new. It is the common roller, closely fitting under and forming the bottom to the seed-box G' and the fertilizer-box G'', and having two small cavities, one of which revolves under each box to convey the necessary proportion of fertilizer and seed from the box at each revolution of the roller. M is the fertilizer agitator, and is of peculiar construction, as will be shown clearly in fig. 2, having two horizontal arms $z$ $z'$ and two vertical arms $z''$ $z'''$, the lower one, $z'''$, projecting downward almost to the roller N, and the upper, $z''$, a forked arm extending nearly to the top of the box. An agitator thus formed will cut and work the fertilizer down to the distributing roller and insure its equable distribution. The construction of the front or furrowing tooth C is also peculiar, having a broad, reversible shovel, $w$, fastened firmly to an upright, which latter is forked at its upper extremity, one part, $y$, being fastened to the draw-beam at $c$ and serving as a brace to strengthen the tooth when the machine is in operation, and the other, $y'$, passing through the draw-beam at $c'$ and confined by a nut, $x$, above and the shoulder $x'$ below the draw-beam.

Having thus described the construction of my combined seeder and fertilizer, what I claim as new, and desire to secure by Letters Patent, is—

1. The furrowing tooth C, having the broad reversible plate or shovel $w$ and brace $y$, substantially as and for the purpose specified.

2. The agitator M in the fertilizer box, having the arms $z$ $z'$ $z''$ $z'''$, substantially as and for the purpose described.

3. The construction of the conducting tube, feed-box, and distributing roller, in such a manner as to show at S the distributing roller N and the interior of the conducting tube H, substantially in the manner and for the purpose specified.

To the above specification of my improvement I have signed my hand this 24th day of April, 1867.

A. P. ROUTT.

Witnesses:
CHAS. A. PETTIT,
S. C. KEMON.